United States Patent
Deokar et al.

(10) Patent No.: US 9,787,346 B2
(45) Date of Patent: Oct. 10, 2017

(54) CONFIGURABLE WEARABLE ELECTRONIC DEVICE

(71) Applicant: Motorola Mobility LLC, Chicago, IL (US)

(72) Inventors: Itisha C Deokar, Buffalo Grove, IL (US); Christopher D Pipe, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/008,968

(22) Filed: Jan. 28, 2016

(65) Prior Publication Data

US 2017/0222681 A1    Aug. 3, 2017

(51) Int. Cl.
*H04M 1/00* (2006.01)
*H04B 1/3888* (2015.01)
*H04B 1/3827* (2015.01)

(52) U.S. Cl.
CPC .......... *H04B 1/3888* (2013.01); *H04B 1/385* (2013.01); *H04B 2001/3861* (2013.01)

(58) Field of Classification Search
CPC .................................................. H04B 1/3888
USPC ...................................................... 455/575.1
See application file for complete search history.

(56) References Cited

U.S. PATENT DOCUMENTS

| | | | |
|---|---|---|---|
| 2013/0336304 A1* | 12/2013 | Lim | G06F 1/163 370/338 |
| 2014/0073486 A1* | 3/2014 | Ahmed | A61B 5/02405 482/9 |
| 2016/0066124 A1* | 3/2016 | Chang | G06Q 30/0269 455/41.2 |
| 2016/0134142 A1* | 5/2016 | Murphy | H02J 7/0044 455/573 |

OTHER PUBLICATIONS

Nathan M. Connell, et al., "Modular Interconnection via Native Interfaces", U.S. Appl. No. 14/827,459, filed Aug. 17, 2015.
Jiri Slaby, et al., "Mobile Device Modular Magnetic Assembly", U.S. Appl. No. 14/802,006, filed Jul. 17, 2015.
Michael J. Lombardi, et al., "Portable Electronic Device Contact Puck Alignment", U.S. Appl. No. 14/629,919, filed Feb. 24, 2015.
Michael J. Lombardi, et al., "Modular Portable Cellular Device Layout and Connection System", U.S. Appl. No. 14/615,519, filed Feb. 6, 2015.

* cited by examiner

*Primary Examiner* — Sanh Phu
(74) *Attorney, Agent, or Firm* — Yudell Isidore PLLC

(57) ABSTRACT

An electronic device includes a pliable casing that enables the electronic device to be configured in at least two different shapes. The two different shapes include a first shape that aligns the electronic device to a second electronic device having a set physical shape and a second shape that has at least one different physical configuration of the casing relative to the first shape. Electronic circuitry is located within the pliable casing that operates to provide at least one functional feature associated with the electronic device. A (Continued)

display screen is embedded in the pliable casing and displays data or images corresponding to the functional feature. A communication mechanism enables information exchange with the host device when the electronic device is brought in communication range of the host device.

24 Claims, 11 Drawing Sheets

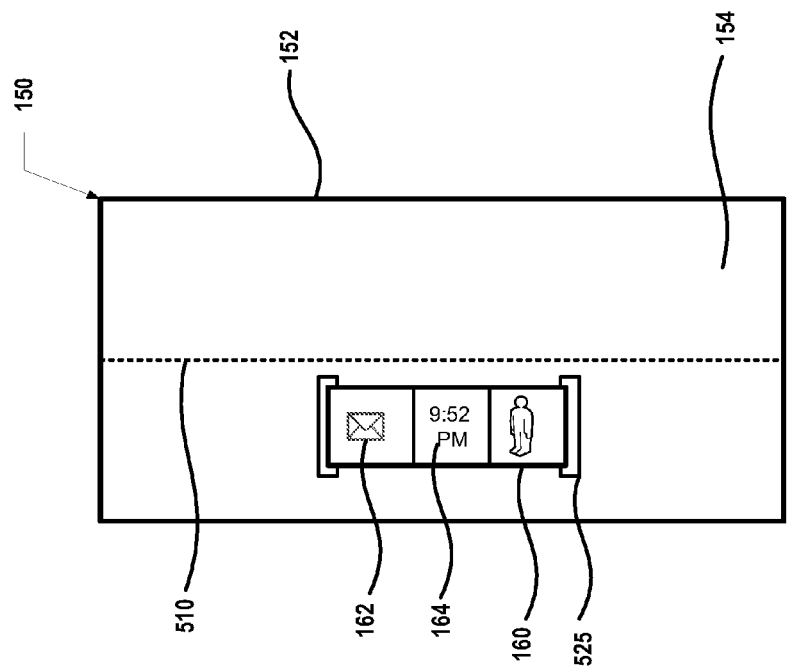
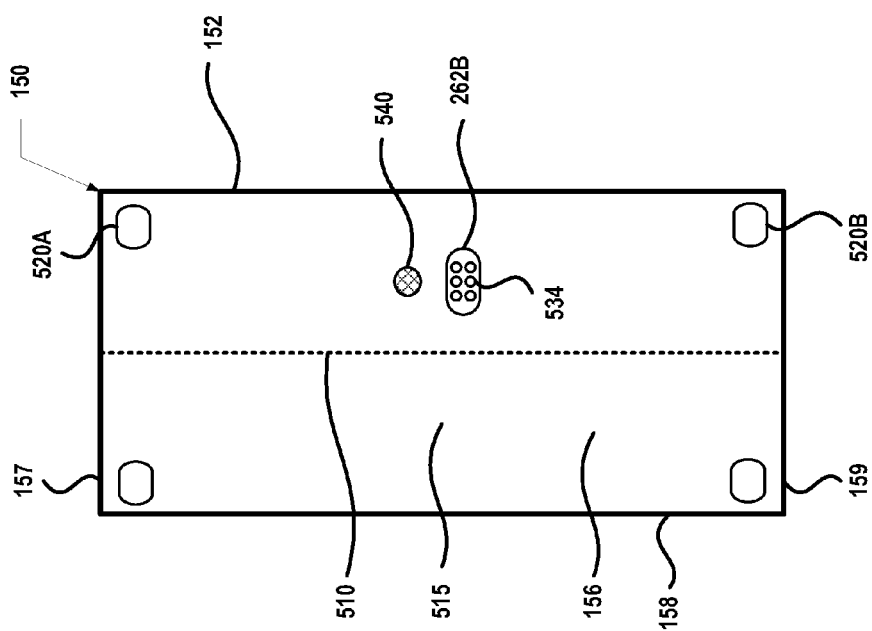
FIG. 5A
FIG. 5B

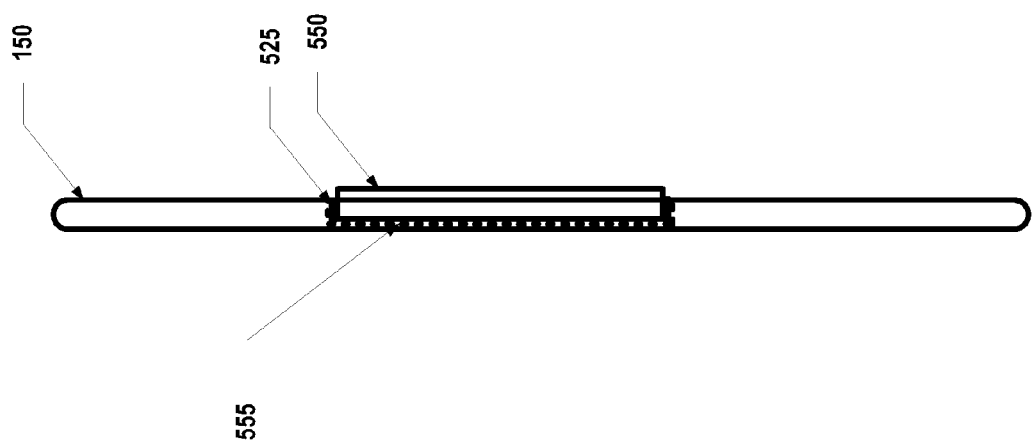
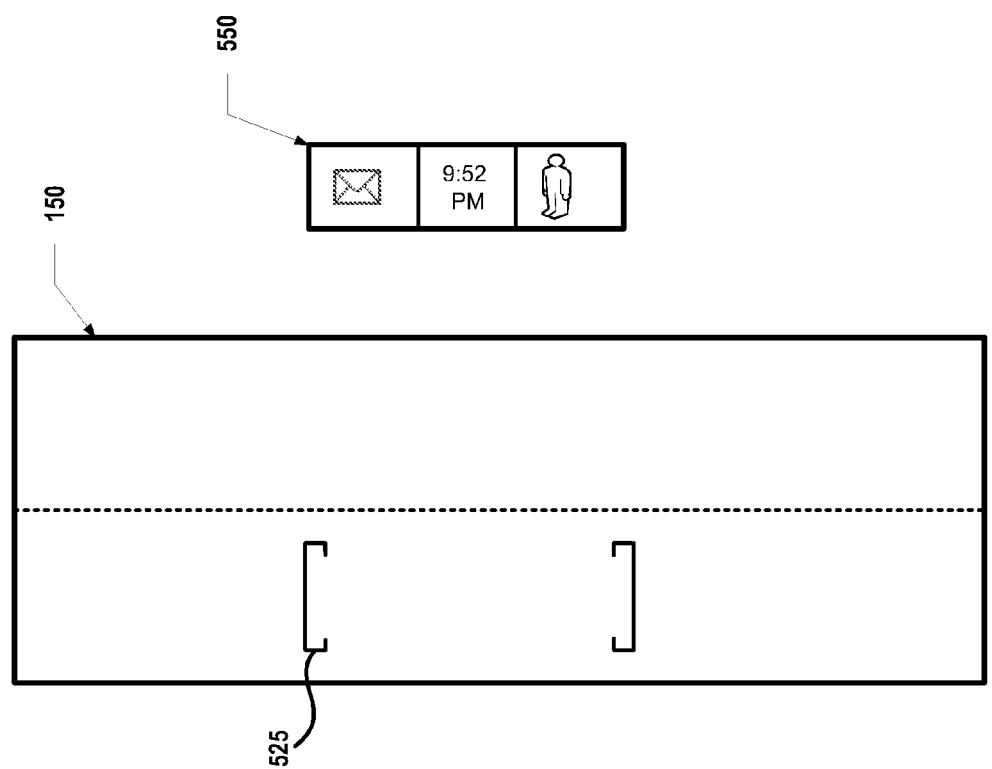

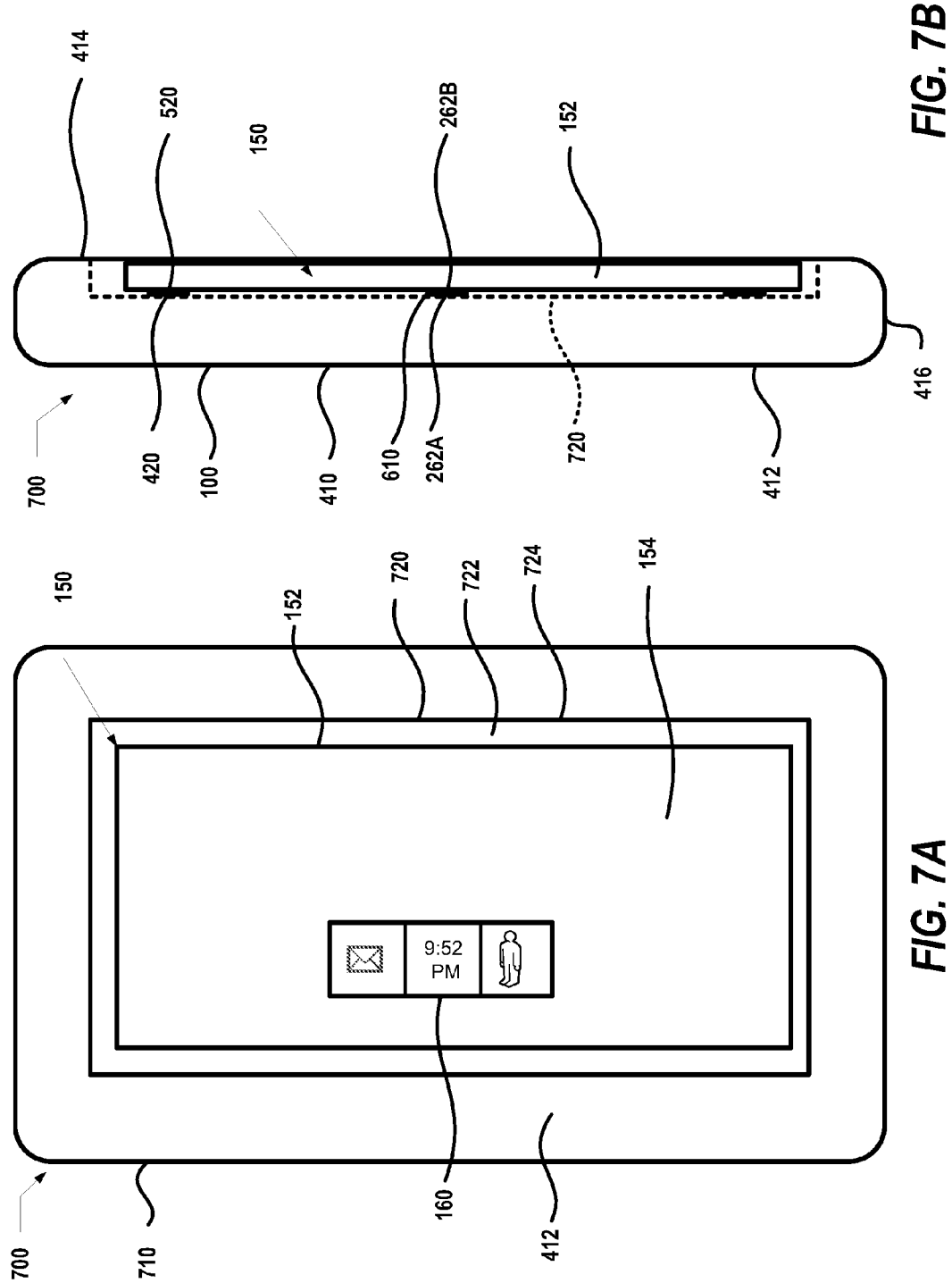

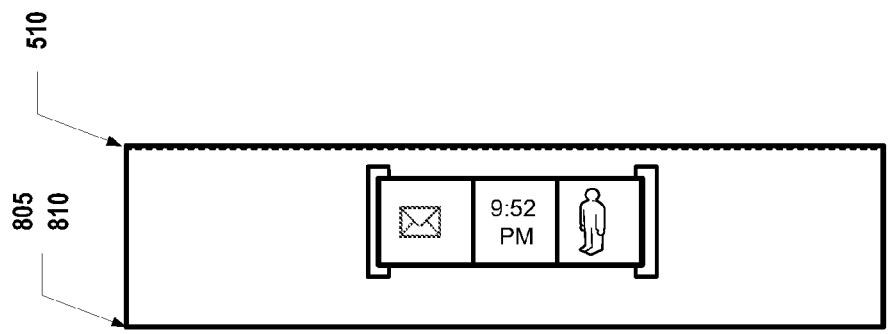
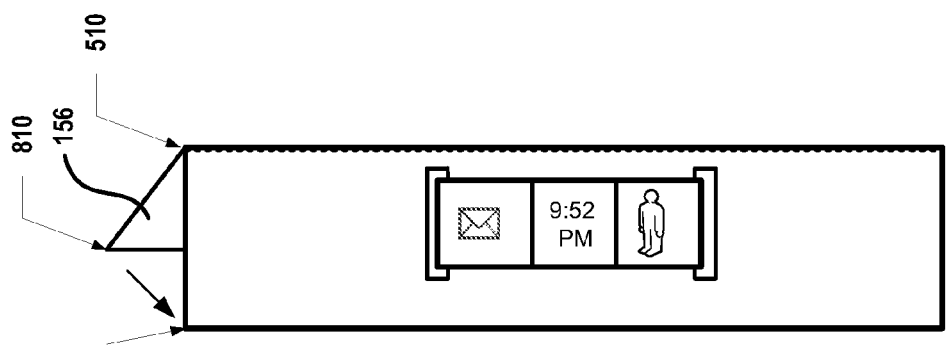
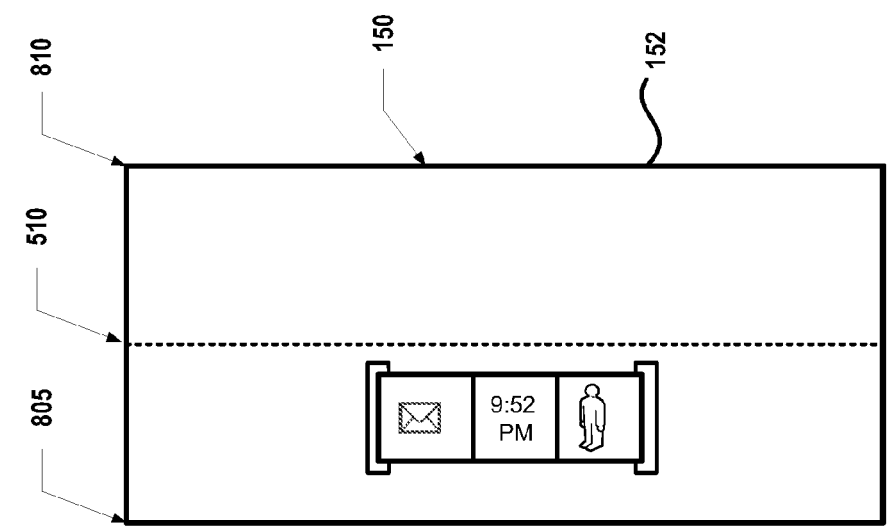

CONFIGURABLE WEARABLE ELECTRONIC DEVICE

BACKGROUND

1. Technical Field

The present disclosure generally relates to electronic devices. More specifically, the present disclosure relates to a wearable electronic device that can be configured into different physical configurations.

2. Description of the Related Art

Electronic devices such as computers and mobile phones are extremely popular and enjoy wide spread acceptance in our society. Various wearable devices have been developed that incorporate computer and advanced electronic technologies. The wearable devices often incorporate practical functions and features and also can have aesthetic features. Some wearable devices have a display that is used to show visual content to a user. Wearable devices such as smart watches and activity trackers are examples of physical objects that have electronics, software, sensors and connectivity to enable the wearable devices to exchange data with other users and connected devices.

BRIEF DESCRIPTION OF THE DRAWINGS

The description of the illustrative embodiments is to be read in conjunction with the accompanying drawings, wherein:

FIG. 5A illustrates a rear view of the example CWE device, according to one embodiment;

FIG. 5B illustrates a front view of the example CWE device, according to one embodiment;

FIG. 5C illustrates the CWE device separated into the pliable casing and a removable/detachable module, according to one or more embodiments;

FIG. 5D illustrates the CWE device with the detachable module inserted into a recess space configured within the pliable casing to receive and hold the detachable module in engagement within the pliable casing, according to one embodiment;

FIG. 7A illustrates a rear view of the CWE device attached and mated within a recessed area in a back surface of a second example mobile device, according to one embodiment;

FIG. 7B illustrates a side view of the CWE device attached and mated within the recessed compartment of the second example mobile device, according to one embodiment;

FIGS. 8A-8C illustrates the bending of the CWE device along a vertical axis to reconfigure the device from an original flat shape for mobile device mating to a thinner wearable shape, according to a plurality of embodiments;

DETAILED DESCRIPTION

Figure 1:
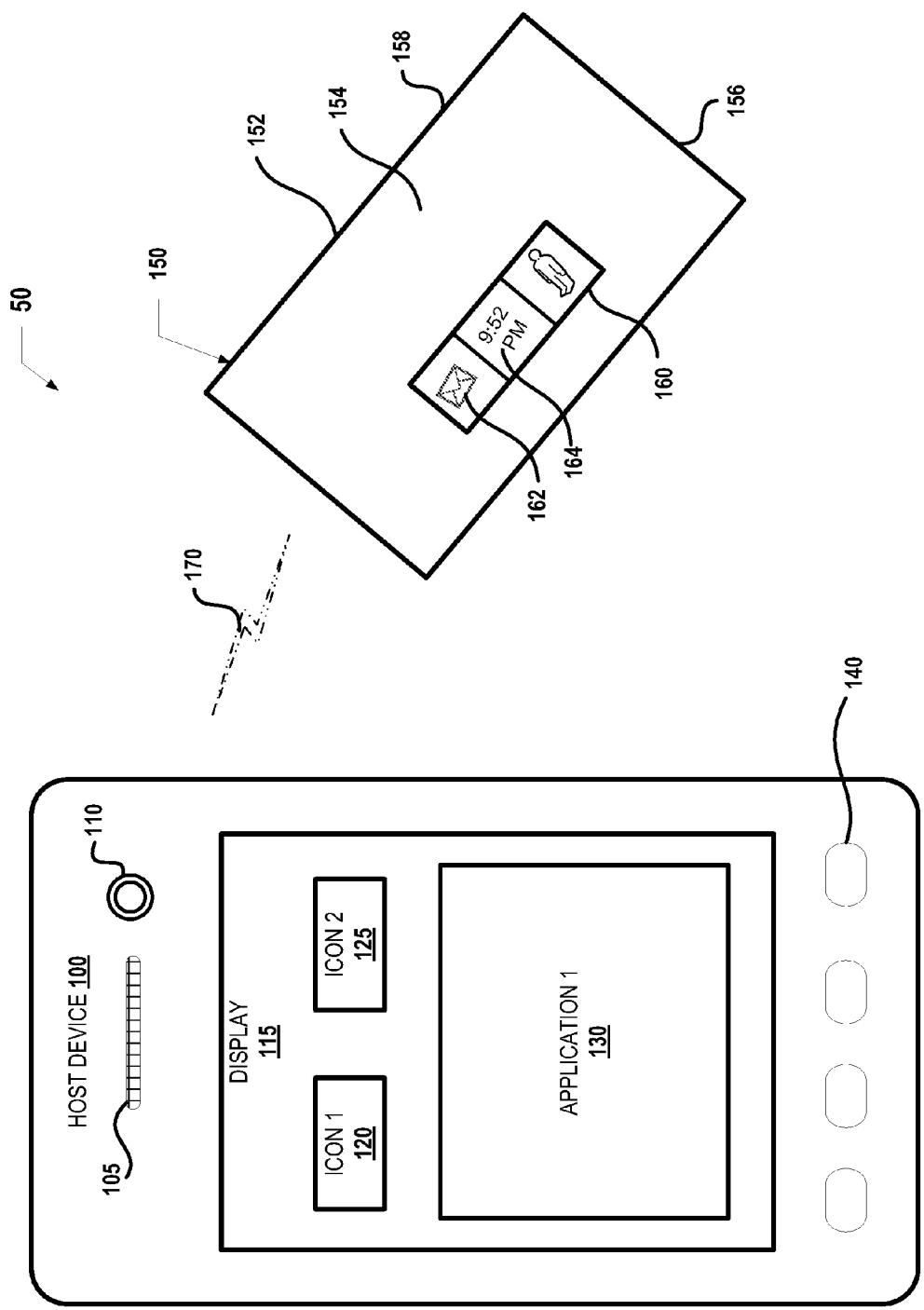
FIG. 1 illustrates a diagrammatic representation of an example dual device system that includes a mobile electronic device and an example configurable-wearable-electronic (CWE) device, according to one embodiment.

The illustrative embodiments provide a configurable, wearable electronic device and apparatus. The electronic device includes a pliable casing made of at least one material that enables the electronic device to be configured in at least two different shapes. The two different shapes include a first shape that aligns the electronic device to a second electronic device having a set physical shape and a second shape that has at least one different physical configuration of the casing relative to the first shape. Electronic circuitry located within the pliable casing operates to provide at least one functional feature associated with the electronic device. A display screen is embedded in the pliable casing and displays at least one of data and an image corresponding to the functional feature. The electronic device includes at least one communication affordance used for communicatively connecting with a corresponding communication port of the second electronic device. The communication affordance mates with the communication port when the electronic device is brought into contact with a mating side of the second electronic device, while the electronic device is in the first shape.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that term is utilized.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments. In the illustration of the various embodiments, two different figures can be provided that have overlaps and/or similarities in the components within the two figures. In such instances, the descriptions of these figures can be presented together to avoid repetition. Components that are not intended to be different from one illustration to the other are provided the same reference numerals within the figures, to simplify the descriptions of the figures. In the description of each of the following figures, reference is also made to elements described in one or more preceding figures.

The below described figures present aspects of the above introduced configurable-wearable-electronic device (hereafter referred to as CWE device 150) and the second electronic device (hereafter referred to as mobile or host electronic device 100). Those of ordinary skill in the art will appreciate that the hardware components and basic configuration depicted in FIGS. 1-10 may vary. The illustrative components within mobile electronic device 100 and CWE device 150 are not intended to be exhaustive, but rather are representative to highlight essential components that can be utilized to implement aspects of the present disclosure. For example, other devices/components may be used in addition to or in place of the hardware depicted. The depicted example is not meant to imply architectural or other limitations with respect to the presently described embodiments and/or the general concepts presented by the disclosure. As a general extension of the disclosure, the aspects described herein as being implemented within or involving a mobile electronic device, illustrated as a mobile phone, are understood to be only a specific example or representation of a mobile electronic device. The described functionality is particularly applicable to a computer system, including a desktop, laptop, tablet, or other type of computing device and may not necessarily be a mobile electronic device.

With reference now to the figures, and beginning with FIG. 1, there is depicted a dual device system 50 that includes example second or host electronic device 100 and example CWE device 150. For purposes of the description of illustrative embodiments, second electronic device 100 is illustrated and described as a mobile electronic device, host device or mobile device 100. Host device 100 can be one of a wide variety of digital/electronic devices that can communicate via wireless transmission over a wireless network, including devices such as a mobile phone, smartphone, personal digital assistant, tablet computer or other digital device. Host device 100 is generally shown having a speaker 105, image capture device 110, such as a camera, and display screen 115. Display screen 115 can display user viewable content generated and/or received by host device 100. As provided by the illustrative embodiment, display screen 115 can display various icons including icon 1 120 and icon 2 125, and display screen 115 can also display application graphical user interface (GUI) 130. The icons 120, 125 can be used to launch various functions and applications of/on host device 100. Host device 100 can also include physical or virtual buttons 140 that allow additional user input to be provided to mobile device 100.

CWE device 150 can be any electronic object that is attachable and detachable from host device 100 and that can be utilized independent of host device 100 in at least one different physical configuration. In one embodiment, CWE device 150 is a user-wearable device such as a smart watch or activity tracker that can be worn by a user. In other embodiments, remote device 150 can comprise a wrist band, a headset, an arm band, a bracelet, a necklace, a belt, a keyboard, and/or other items utilized to remotely communicate with host device 100. In the illustrated example, remote device 150 is a user wearable device. CWE device 150 includes flexible/pliable casing 152. Casing 152 can be made from a variety of materials such as cloth, rubber, plastic, and bi-stable spring materials (e.g., a snap-band). Because casing 152 is pliable, casing 152 can be formed into a variety of shapes. In the illustrative embodiment, casing 152 has a front side or surface 154, a back or mating side or surface 156 and four outer peripheral edges 158. It is appreciated that a different shaped casing can be utilized for other embodiments/implementations of CWE device 150.

According to the illustrative embodiment, pliable casing 152 has display screen 160 mounted thereto. In one embodiment, display screen 160 is embedded within pliable casing 152. Display screen 160 can have a flat shape or can be made with pliable materials that enable the shape of the display screen to be re-configurable (e.g., changed from a flat shape to be at least partially curved). According to one aspect, display screen 160 can display at least one of an image 162 or data 164 corresponding to at least one functional feature performed by remote device 150. The functional feature can vary by design and/or use of CWE device 150, without limitation. In one embodiment display screen 160 can be a touch screen display that can receive input from a user. In an embodiment, display screen 160 can be a bendable, organic light emitting diode (OLED) display. With this embodiment, the display screen 160 can also be bent into a different shape as the casing is being re-configured. In one embodiment, display screen 160 can occupy a majority of front surface 154 and can include one or more buttons for user interfacing.

CWE device 150 includes at least one communication mechanism that enables information exchange with the host device 100 when CWE device 150 is brought in communication range of host device 100. It is appreciated that the communication range of host device 100 is variable depending on the design of each of the devices and the mechanism being utilized to communicate between the two devices. Thus, a first host device can provide a communication range of a first distance, while another host device can provide a communication range of a different distance for the same WCE device. Alternatively, the same host device can provide a communication range of a second distance for a first WCE device, while only providing a communication range of a third, different distance for a second WCE device, based on the available communication devices (e.g., Bluetooth or NFC) built into and/or supported by the respective WCE devices. In one embodiment, the at least one communication mechanism includes a physical communication affordance for coupling to a corresponding communication port located on the host device when the electronic device is brought into contact with a mating side of the host. The mating of the communication affordances with the communication port is enabled while the electronic device is in the first shape and oriented with the communication affordance facing the mating side of the host device. With that embodiment, the communication affordance includes a power bus that enables the electronic device to receive power from the host device while the electronic device and the host device are interconnected. The communication affordance also includes a data bus that enables communicating information between the electronic device and the host device. In another embodiment, which can be an alternate embodiment or simply an additional aspect supported within the above embodiment (i.e., with the physical communication affordance), the at least one communication mechanism is or includes a wireless communication component that enables a paired wireless connection to the host device for wireless communication between the electronic device and the host device for use as at least one of an input device and an output device. Additionally, in at least one extension of the wireless embodiment, the at least one communication mechanism includes a wireless power receiving component that receives wireless power from a power generating source of the host device. The wireless power receiving component can be (or include) one or more of a variety of devices, such as an inductive power receiving component or a magnetic resonance component. With this embodiment, the received wireless power is utilized to charge a battery that is utilized to power the electronic device. Also, as one aspect, the charging of the battery occurs while the electronic device is within a charging range of the power generating source. The embodiments providing both wireless communication and powering of WCE device 150 can be implemented independent of a physical connection, such that the WCE device (150) can be optionally designed without the physical communication affordance, in an alternate embodiment. In this alternate embodiment, host device 100 and CWE device 150 can communicate via wireless signal 170 and WCE device 150 is charged wirelessly.

Figure 2:
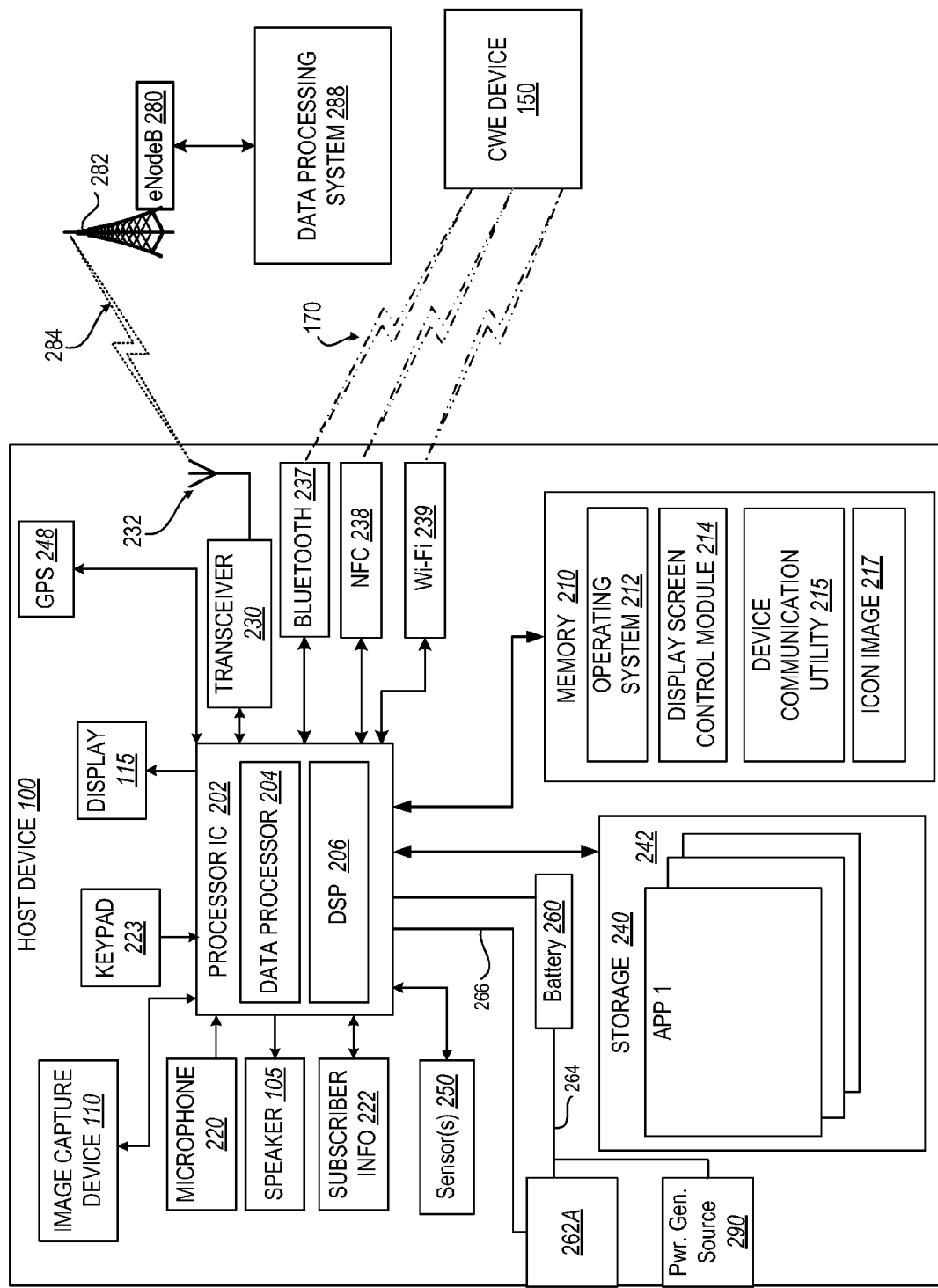
FIG. 2 illustrates a block diagram representation of an example mobile electronic device with wireless connections to external networks and devices, according to one embodiment.

FIG. 2 illustrates an example host device 100 with wireless connection capability enabling connections to external wireless networks and remote devices. Host device 100 includes processor integrated circuit (IC) 202 that has data processor 204 and digital signal processor 206. Processor IC 202 is in communication with memory 210 and storage 240 via a communication bus or direct connection. Memory 210 is a non-transitory computer readable storage medium/device that stores data and software programs and code that can be executed on processor IC 202. In one embodiment, memory 210 is a non-volatile memory. Memory 210 can contain operating system 212, display screen control module 214, device communication utility 215 and icon image 217.

Operating system 212 manages the hardware resources of host device 100 and provides common services for software applications. Display screen control module 214 executes on processor IC 202 to control the operation of display screen 115 and to perform various functional processes described herein. Device communication utility 215 executes on processor IC 202 to manage communications between host device 100 and CWE device 150. Icon image 217 is a stored image of an icon that can be displayed on display 115.

Storage 240 is a computer readable storage medium/device that stores data and software programs and code that can be executed on processor IC 202. In one embodiment, storage 240 is a non-volatile memory. Storage 240 includes one or more software applications (APP) 242, an example of which is shown as APP 1. Software applications 242 execute on processor IC 202 to perform various functional processes. In one example embodiment, software applications 242 can cause host device 100 to be linked to and send and receive data from CWE device 150.

Host device 100 further comprises image capture device 110, microphone 220, speaker 105, keypad 223, and display 115 all of which are connected to processor IC 202. Host device 100 accepts user input using microphone 220, keypad 223 and display 115 when the display is a touch screen. Host device 100 provides audio output to a user via speaker 105 and visual output via display 115. Subscriber information module 222 is communicatively coupled to processor IC 202. Subscriber information module 222 can be a removable memory module that contains encrypted access data that allows host device 100 to access a wireless network via eNodeB 280. Host device 100 also has a Bluetooth transceiver 237, near field communication transceiver (NFC) 238, and a Wi-Fi transceiver 239. Bluetooth device 237, NFC device 238, and Wi-Fi device 139 are in communication with processor IC 202. Bluetooth device 237, NFC device 238, and Wi-Fi device 239 allow for host device 100 to communicate with similarly equipped devices, illustrated as CWE device 150, in close proximity or over a short range. As provided by one or more embodiments described herein, CWE device 150 can be an example user wearable device.

Host device 100 further includes a transceiver 230 that is communicatively coupled to processor IC 202 and to antenna 232. Transceiver 230 allows for wide-area or local wireless communication between host device 100 and evolved node B (eNodeB) 280 via a wireless signal 284. Host device 100 can be communicatively coupled to and in communication with data processing system (DPS) 288 via a communication path involving transceiver 230, antenna 232, wireless signal 284 and eNodeB 280. Host device 100 is capable of wide-area or local wireless communication with other mobile wireless devices or with eNodeB 280 that are at a fixed location. DPS 288 can transmit data and software to host device 100 and receive data transmitted from host device 100 and other mobile devices connected to the wireless network.

Host device 100 further has a global navigational satellite system (GNSS) module 248 and one or more sensors 250 that are in communication with processor IC 202. GNSS module 248 can receive signals from GNSS satellites in Earth orbit to provide location and time information to a user. In one embodiment, GNSS module 248 can be used to track the position of host device 100. Host device 100 can transmit the location of host device 100, as determined by GNSS 248, to CWE device 150 by a communication mechanism such as Bluetooth transceiver 237, NFC transceiver 238, or other communication devices. Sensor 250 can be a Hall Effect sensor or a proximity sensor, and can be used to detect the presence of CWE device 150, in one embodiment. Host device 100 also contains a power source such as a battery 260 that supplies power to host device 100 and also can supply power to CWE device 150 via communication affordance or port 262A. Battery 260 is connected to communication port 262A by power bus 264. Data bus 266 is also connected to communication port 262A. The communication affordance (i.e., communication port 262A) allows host device 100 to supply power to and communicate with CWE device 150 when CWE device 150 is mated to host device 100. In one embodiment, communication port 262A is a serial port or a USB (universal serial bus) port having receptacle(s) for receiving pins of a corresponding male serial port associated with CWE device 150 or other similar device. Host device 100 further includes a power-generating source 290 that provides inductive power to CWE device 150 when the CWE device is within a charging range or distance of host device 100.

Figure 3:
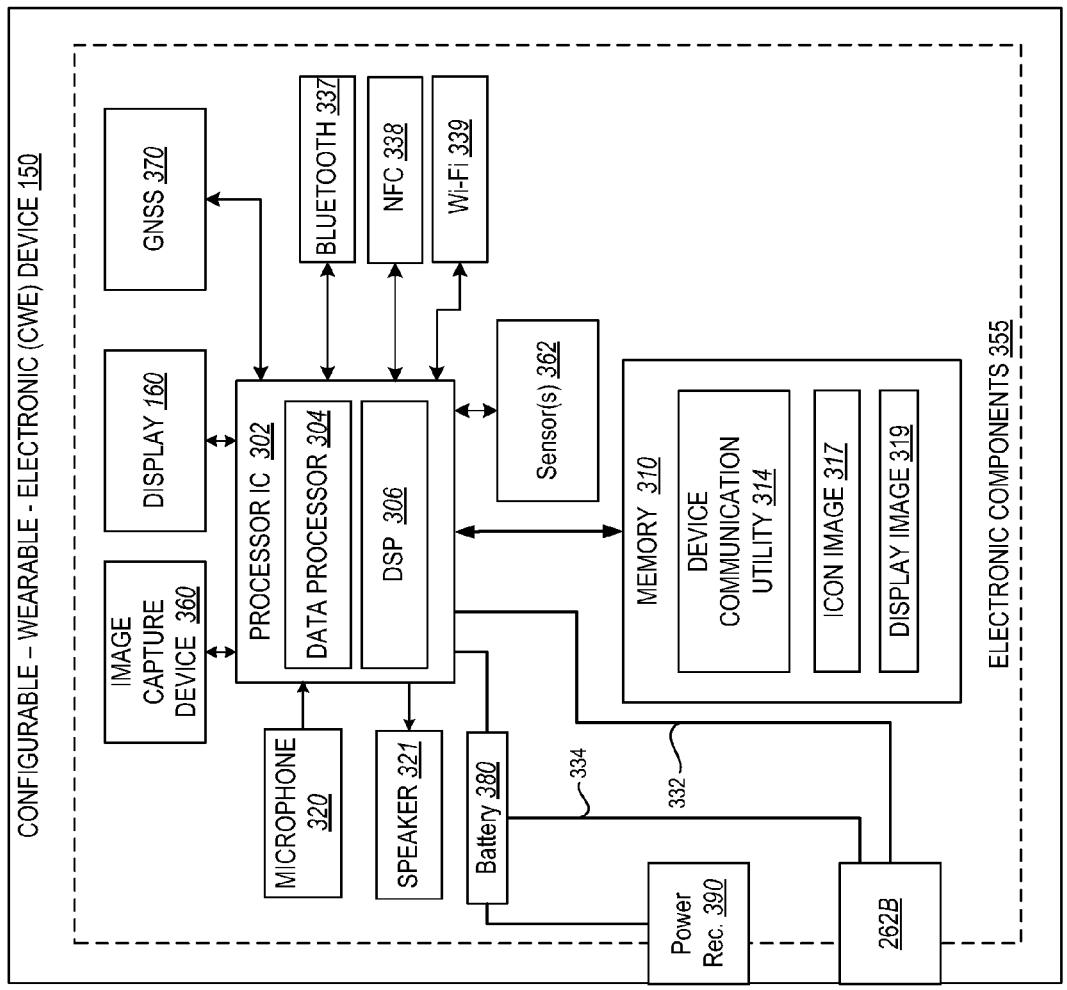
FIG. 3 illustrates a diagrammatic representation of an example CWE device, according to one embodiment.

FIG. 3 illustrates further details of the electronic and physical makeup of CWE device 150. As previously introduced, CWE device 150 includes casing 152 (FIG. 1) with display 160 embedded therein or attached thereto. CWE device 150 includes additional electronics components 355 that are embedded within casing 152. Electronic components 355 can include processor integrated circuit (IC) 302. Processor IC 302 includes data processor 304. In one embodiment, processor IC 302 can also include digital signal processor 306. Processor IC 302 is communicatively coupled with memory 310. Memory 310 is a computer readable storage medium/device that stores data and software programs and code that can be executed on processor IC 302. In one embodiment, memory 310 is a non-volatile memory. Memory 310 can contain device communication utility 314, icon image 317 and display image 319. Device communication utility 314 executes on processor IC 302 to manage communications between CWE device 150 and host device 100. Icon image 317 is a stored image of a known icon that can be displayed on display 160. Display image 319 is a stored image of an image that can be displayed on display 160. In one embodiment, icon image 317 can be a local copy of icon image 117. In at least one embodiment, the hardware components are configured on a system/device on a chip, minimizing the size of the electronics within CWE device 150.

CWE device 150 can further comprise microphone 320, speaker 321, and/or image capture device 360, each connected to processor IC 302. CWE device 150 accepts user input using microphone 320 and provides audio output to a user via speaker 321. CWE device 150 also has Bluetooth transceiver 337 and/or near field communication (NFC) transceiver 338 and/or Wi-Fi transceiver 339 communicatively coupled with processor IC 302. Bluetooth transceiver 337 can communicate with Bluetooth transceiver 237 of host device 100 when CWE device 150 is in close proximity to host device 100. Similarly, NFC transceiver 338 can communicate with NFC transceiver 238 of host device 100 when CWE device 150 is in close proximity to host device 100. Wi-Fi transceiver 339 can communicate with Wi-Fi transceiver 239 of host device 100 when CWE device 150 is in close proximity to host device 100. Bluetooth transceiver 337 and NFC transceiver 338 and Wi-Fi transceiver 339 allow for CWE device 150 and host device 100 to transmit and receive instructions and data to and from each other.

CWE device 150 further has at least one sensor 362 and a GNSS module 370 which are communicatively coupled with processor IC 302. Sensor 362 can be any one or more of a wide variety of sensors, such as a temperature sensor, a barometer, an accelerometer or a light sensor. GNSS module 370 can receive signals from GNSS satellites in Earth orbit to provide location and time information to a user. In one embodiment, GNSS module 370 can be used to track the position of CWE device 150. CWE device 150 can transmit the location of CWE device 150, as determined by GNSS 370, to host device 100 by a communication mechanism such as Bluetooth transceiver 337, NFC transceiver 338, Wi-Fi transceiver 339, or other communication devices.

According to one aspect, processor IC 302 can link CWE device 150 to host device 100 via a communication mechanism. In the illustrative embodiment, CWE device 150 contains externally positioned communication affordance or port 262B. CWE device 150 also includes a power source, such as battery 380, which supplies power to CWE device 150. Battery 380 is connected to communication affordance or port 262B by a power bus 334. A data bus 332 is also connected to communication port 262B. The communication affordance or port allows CWE device 150 to mate to host device 100 and to receive power from and to communicate with host device 100 when CWE device 150 is mated to host device 100. Thus, the communication affordance can be an electronic/serial port interface that includes pins or receptacles for mating to/with the corresponding receptacles/pins of another serial port interface on host device 100, in one embodiment. CWE device 150 can transmit a list of available capabilities of CWE device 150 to host device 100 such that host device 150 knows the supported capabilities and functions of CWE device 150. When CWE device 150 is detached from host device 100, communication can continue with the host device via the communication mechanism such as Bluetooth transceiver 337 or NFC transceiver 338 or Wi-Fi transceiver 339.

In one embodiment, processor IC 302 can provide at least one functional feature associated with CWE device 150. In one embodiment, processor IC 302 can cause CWE device 150 to function as a camera via image capture device 360. In another embodiment, processor IC 302 can cause CWE device 150 to function as an activity tracker via sensor 362, such as when the sensor is an accelerometer.

CWE device 150 further includes an inductive power receiving component 390. Inductive power receiving component 390 receives inductive power from power generating source 290 of the host device (see FIG. 2), when CWE device 150 is within a charging range of power generating source 290. CWE device 150 utilizes the received inductive power to charge battery 380 which is used to power CWE device 150.

Figure 4:
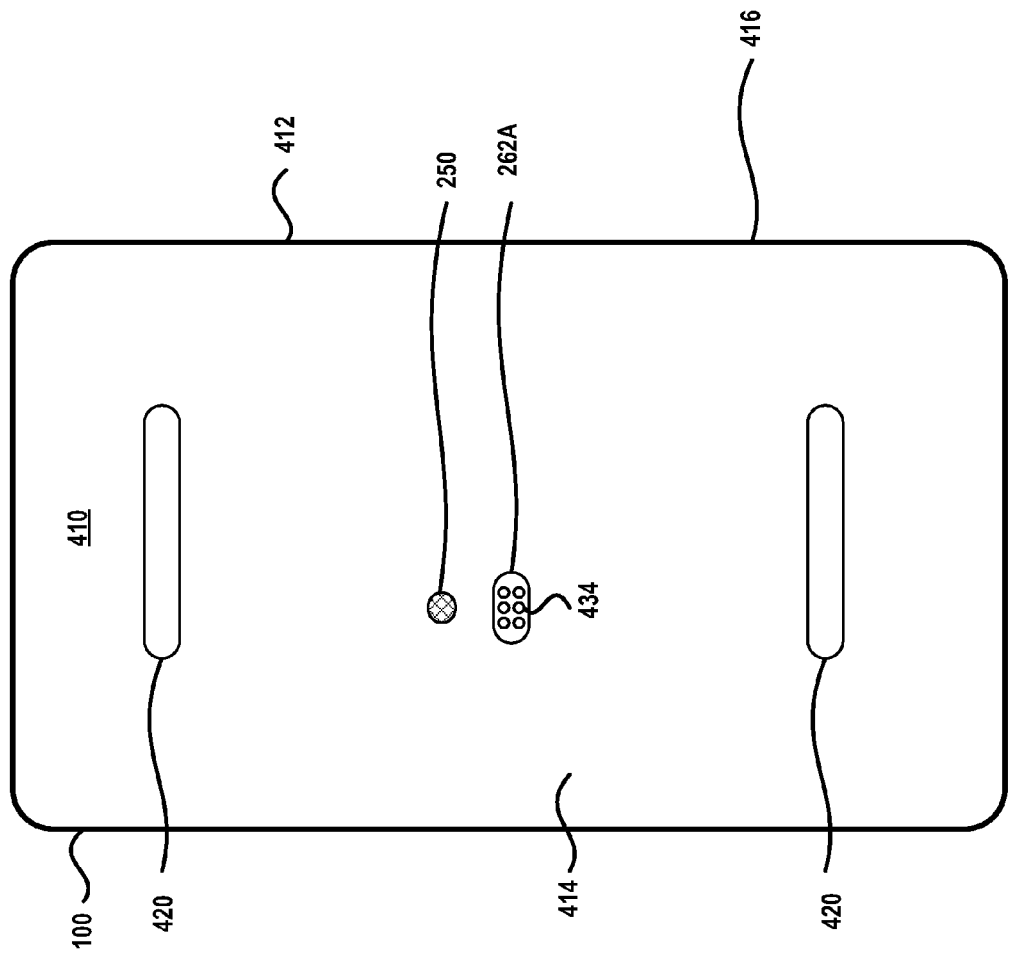
FIG. 4 illustrates a rear view of the example mobile device, according to one embodiment.

Referring to FIG. 4, there is illustrated an embodiment of the back surface of host device 100. In one embodiment, host device 100 includes a housing 410 that has a front side or surface 412, a back or mating side (or surface) 414 and four outer peripheral edges 416. One or more host retention features 420 are mounted to or embedded within mating side 414. Host retention features 420 can be one of several attachment devices, such as a magnet, a magnetically attractable material, a hook and loop fastener or a retaining tab. A host device (or host) communication port 262A is mounted to or embedded within mating side 414. Communication port 262A has an array of input/output (I/O) receptacles 434. A sensor 250, such as a Hall Effect sensor, is also mounted to or embedded within mating side 414.

Turning to FIGS. 5A and 5B, there are illustrated a front view and a back view of an embodiment of CWE device 150. In one embodiment, CWE device 150 includes a flexible pliable casing 152 that can be wrapped or folded about one or more fold lines 510 to form one or more foldable sections 515. The fold lines 510 and corresponding foldable sections 515 enable the pliable casing to be folded and/or bent to form a variety of other shapes or configurations. Casing 152 has a front side or surface 154, a back or mating side (or surface) 156, ends 157 and 159, and side edges 158. Display screen 160 can be mounted to or embedded within pliable casing 152. In one embodiment display screen 160 can display at least one of an image 162 or data 164 corresponding to at least one functional feature performed by CWE device 150. In one embodiment, display screen 160 can be a touch screen display that can receive input from a user. Display screen 160 can be coupled to pliable casing 152 via a display-casing retaining mechanism 525. Display-casing retaining mechanism 525 can be a variety of mechanisms such as a snap fit mechanism, spring tabs, magnets or hook and loop fasteners. In one embodiment, display screen 160 can be selectively attached and removed from pliable casing 152 by a user via display-casing retaining mechanism 525.

As one aspect of the disclosure, illustrated by FIGS. 5C-5D, CWE device 150 can include detachable module 550 that can be selectively attached to and removed from pliable casing 152. Detachable module 550 can be surface mounted, as illustrated by FIG. 5B. As shown by FIG. 5D, detachable module 550 can also be fully or partially embedded into recess space 555 of pliable casing 152 that is configured (with retention mechanisms 525) to receive and retain detachable module 550. In one embodiment, detachable module 550 can be display screen 160 that is selectively detachable via display-casing retaining mechanism 525. Detachable module 550 can then display/present information corresponding to functional operation of detachable module 550 and/or CWE device 150 and/or host device 100. In other embodiments, detachable module 550 can be and/or include a wide variety of functional devices, such as a camera, a microphone, a speaker, or a tracking device, which can each function independently when separated from pliable casing 152. As one example where detachable module is (or includes) a microphone, the microphone can be an adhesively-held microphone that is be stuck on the pliable material and utilized for audio/voice communication and/or for noise cancelling. In the embodiment in which detachable module 550 is or includes a tracking device, the tracking device can be support of a plurality of available tracking technologies, with GNSS module 370 (FIG. 3) being one or many possible implementations of tracking devices. When detachable module 550 is separated from pliable casing 152, the location of the tracking device (e.g., GNSS module 370), and by extension the location of detachable module 550 and the user/wearer of detachable module 550, can be monitored by or from host device 100 (and/or from pliable casing 152, in alternate embodiments where pliable casing 152 also includes functional components for interfacing with and/or tracking detachable module 550). It is appreciated that other types of tracking devices can be implemented within detachable module 550 and/or CWE device 150. When a separate, fully functional component, detachable module 550 can include electronic components that enable detachable module 550 to operate independently of pliable casing 152. In one embodiment, all of the electronics of CWE device 150 can be maintained within detachable module 550, with pliable casing 152 being utilized solely to support the mating functions and wearable functionality of the CWE device 150. In another embodiment, pliable casing 152 includes some of the electronics supporting the full functionality of CWE device 150. In one embodiment, detachable module 550 includes at least one wireless communication device, which enables wireless communication with at least one of pliable casing 152 and host device 100.

CWE device 150 further includes one or more remote device retention features 520A and 520B that are mounted to mating side 156. Remote device retention features 520 can be one of several attachment devices such as a magnet, a magnetically attractable material, a hook and loop fastener or a retaining tab. Remote device retention features 520 mate with host device retention features 420 in order to selectively retain CWE device 150 to the mating side of 414 of host device 100 when mating side 156 of CWE device 150 is brought into contact with mating side 414 of host device 100. In one embodiment, retention feature 420 can be a magnet, and retention feature 520 can be a magnetically attractable material such as iron or steel. In another embodiment, retention feature 420 can be the hook portion of a hook and loop fastener and retention feature 520 can be the loop portion. It is appreciated that, for embodiments in which CWE device 150 includes detachable module 550, as presented in FIG. 5C, a similar set of connecting affordances as described herein for mating to the host device can be applied and/or implemented to attach detachable module 550 to pliable casing 152, without limitation. CWE device 150 further includes a communication port 262B mounted to mating side 414. When styled as a serial port connector, communication port 262B has an array of input/output (I/O) pins 524. Magnet 540 is mounted to mating side 156 adjacent to communication port 262B. Magnet 540 is sensed by a Hall Effect sensor mounted to host device 100 as will be described later.

While FIG. 5A shows pliable casing 152 folded in half along a vertical axis, fold line 510 can be also be along a different axis, multiple axes or have multiple folds within the CWE device. Also, while FIG. 5A shows communication port 262B located off to one side of CWE device 150 and FIG. 5B shows display 160 located off to one side of CWE device 150, the location of communication port 262B, display 160 and any electronic components are not restricted to the off-centered view shown but can be located central to the device, particularly if the host device has a corresponding centrally located interface. In one or more alternate embodiments, display 160 can be replaced by other various devices such as a keyboard, mouse, track-ball or other input or output devices. Pliable casing 152 contains electronic components 355 (FIG. 3) that are embedded within casing 152. The electronic components 355 operate to provide at least one functional feature associated with CWE device 150.

Figure 6B:
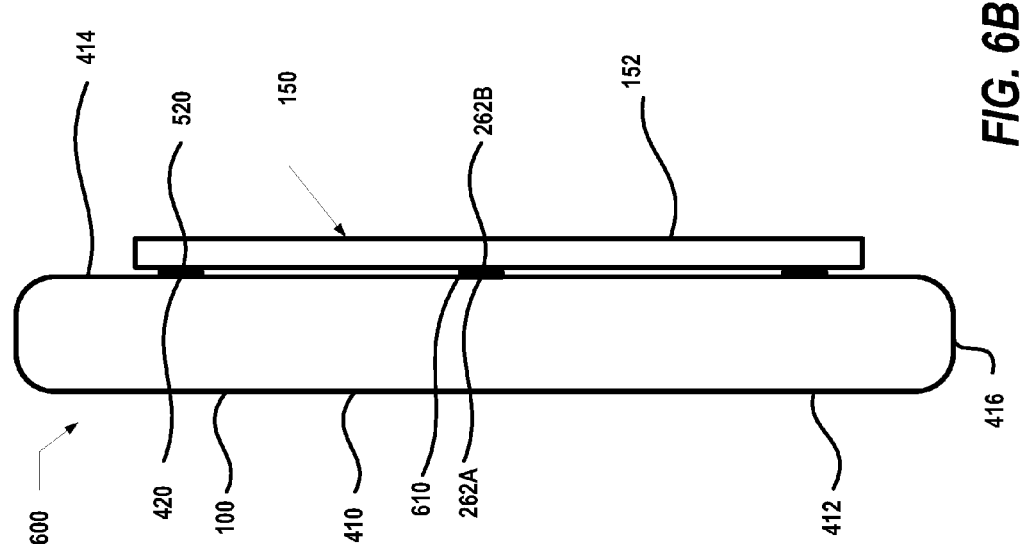
FIG. 6B illustrates a side view of the attachment and mating of the CWE device to the mobile device, according to one embodiment.
Figure 6A:
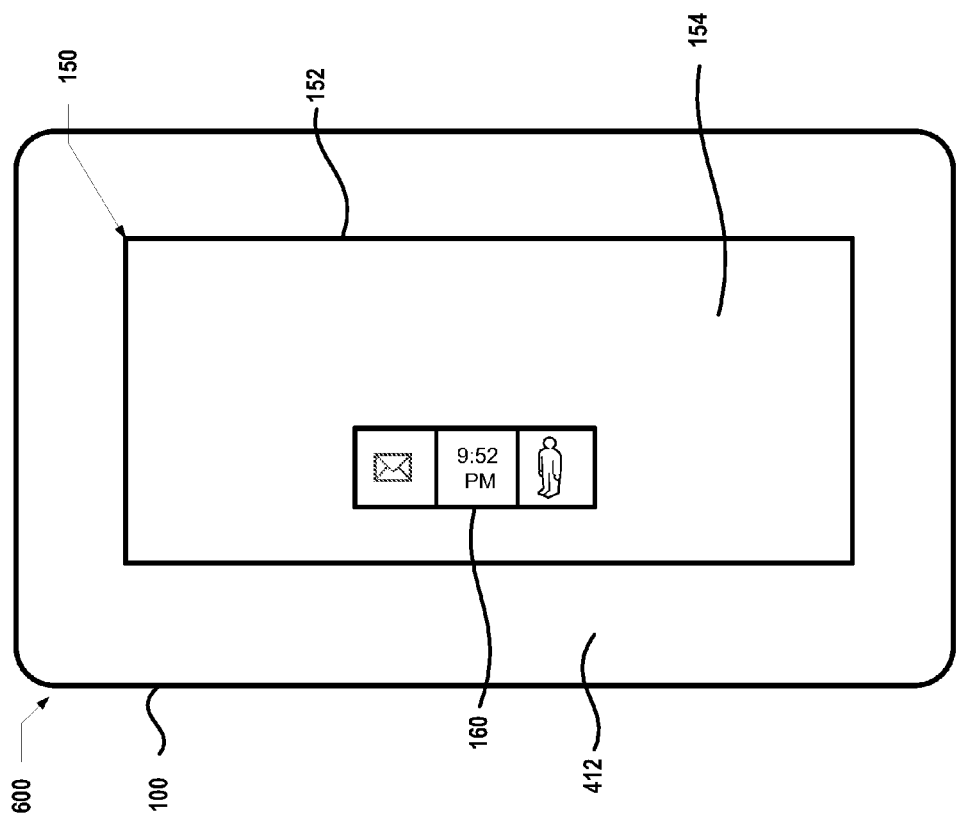
FIG. 6A illustrates a rear view of the example CWE device attached and mated to the example mobile device, according to one embodiment.

Referring to FIGS. 6A and 6B, there are illustrated two views of mated configuration 600 of host device 100 and CWE device 150. When mating side 156 of CWE device 150 is aligned and brought into contact with mating side 414 of host device 100, retention features 520 mate with the host device retention features 420 in order to retain CWE device 150 to the mating side of 414 of host device 100. At the same time, the communication port 262B mates with the host device communication port 262A to form a communication portal 610 between CWE device 150 and host device 100. In the mated configuration 600, magnet 540 is juxtaposed to Hall Effect sensor 250. When Hall Effect sensor 250 senses the presence of magnet 540, Hall Effect sensor 250 transmits an electrical signal to processor IC 102 in order to indicate that CWE device 150 is mated to host device 100.

In mated configuration 600, CWE device 150 and host device 100 can communicate with each other through communication portal 610. Also, in mated configuration 600, CWE device 150 can receive power to recharge battery 380 via communication portal 610 and respective power buses 264 and 334. Further, in mated configuration 600, CWE device 150 can receive data via communication portal 610 and data buses 266 and 332. While CWE device 150 and host device 100 are separated, Bluetooth transceiver 337 can communicate with Bluetooth transceiver 237 of host device 100 whenever CWE device 150 is in close proximity to host device 100. Similarly, NFC transceiver 338 can communicate with NFC transceiver 238 of host device 100 whenever CWE device 150 is in close proximity to host device 100. Wi-Fi transceiver 339 can communicate with Wi-Fi transceiver 239 of host device 100 when CWE device 150 is in close proximity to host device 100. To enable this wireless communication, both devices can be paired to each other during setup configuration of one or both device. Once pairing is completed, Bluetooth transceiver 237, NFC transceiver 238, and/or Wi-Fi transceiver 339 allow for host device 100 and CWE device 150 to transmit and receive instructions and data from each other when separated.

Referring to FIGS. 7A and 7B, there are illustrated two views of a mated configuration 700 of host device 710 with a recessed mating surface and CWE device 150. Host device 710 is similar to host device 100 except that a recess cavity or receptacle 720 has been formed in mating side 414. Recess receptacle 720 is defined by bottom surface 722 and side surfaces 724. Receptacle 720 is dimensioned to receive remote device 150 such that remote device 150 fits into receptacle 720. In one embodiment, casing 152 can be at least partially folded along one or more fold lines 510 in order to fit into receptacle 720.

When mating side 156 of CWE device 150 is aligned, placed in receptacle 720, and brought into contact with bottom surface 722 of receptacle 720 of CWE device 700 by a user, retention features 520 mate with host device retention features 420 in order to retain CWE device 150 to bottom surface 722. At the same time, communication port 262B mates with the host device communication port 262A to form a communication portal 610 between CWE device 150 and host device 100. In the mated configuration 700, magnet 540 is juxtaposed to Hall Effect sensor 250. When Hall Effect sensor 250 senses the presence of magnet 540, Hall Effect sensor 250 transmits an electrical signal to processor IC 102 in order to indicate that CWE device 150 is mated to host device 100.

FIGS. 8A-8C illustrate an example of the bending of CWE device 150 along a vertical axis or fold line 510 to reconfigure the device from an original flat shape for host device mating to a thinner, wearable shape, with the back mating port and attachment affordances covered for user comfort, according to one or more embodiments. In FIG. 8A, CWE device 150 is shown unfolded with casing 152 having with one or more fold lines 510 that define a first half 805 and a second half 810. FIG. 8B shows pliable casing 152 being folded along fold line 510 with second half 810 being moved toward first half 805. FIG. 8C shows pliable casing 152 folded along fold line 510 with second half 810 in contact with first half 805. In FIG. 8C, opposed portions of mating side 156 on each of respective first half 805 and second half 810 are juxtaposed to each other. Also, communication port 262B and attachment affordances 520 are covered by a portion of the pliable casing 152 for user comfort and/or for protection of the communication port 262B.

Figure 9A:
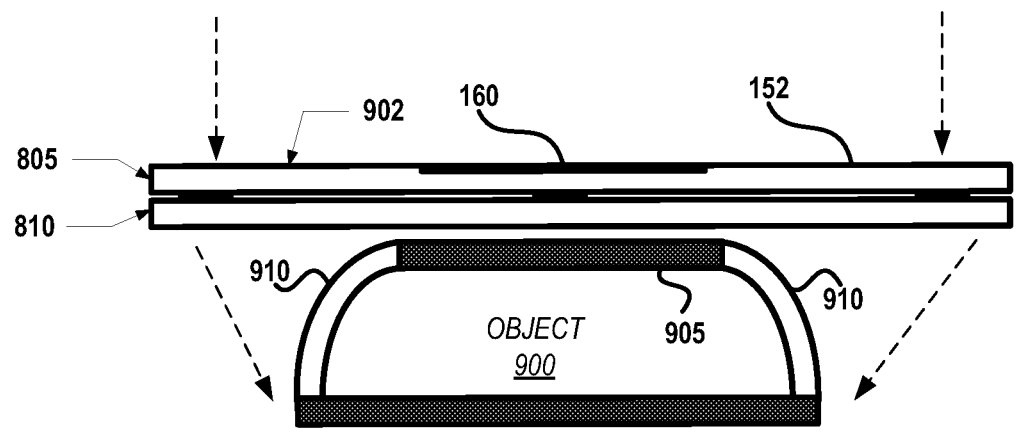
FIGS. 9A-9B illustrates the re-configuration of the CWE device from a flat shape required for mobile device mating to a curved, wearable shape, according to a plurality of embodiments.
Figure 9B:
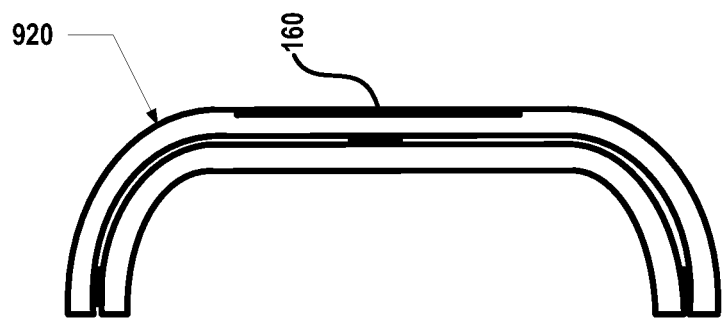

FIGS. 9A-9B illustrates the re-configuration of CWE device 150 from a flat shape 902 (FIG. 9A) required for mobile device mating to a curved, wearable shape 920 (FIG. 9B). The CWE device 150 is folded and at least partially wrapped around an object 900 to form or be configured in a curved shape as a curved band shape 920. The pliable casing 152 covers a top section 905 of object 900 and curves around curved sections 910, with second half 810 in contact with object 900. In one embodiment, object 900 can be a wrist. When the pliable casing 152 is formed from bi-stable spring materials (e.g., a snap-band), the curved shape is maintained by the rigidity of the bi-stable spring material. If the pliable casing 152 is formed from cloth, rubber or plastic the curved shape can be maintained by retention features 520 (FIG. 5A). For example, retention feature 520A can be a hook portion of a hook and loop fastener and retention feature 520B can be a loop portion of a hook and loop fastener. When retention feature 520A is brought into contact with retention feature 520B, the hook mates with the loop to retain ends 157 and 159 together. In one embodiment, retention feature 520A can be a magnet and retention feature 520B can be a magnetically attractive material. When retention feature 520A is brought into contact with retention feature 520B, the magnetically attractive material is retained to the magnet.

Figure 10:
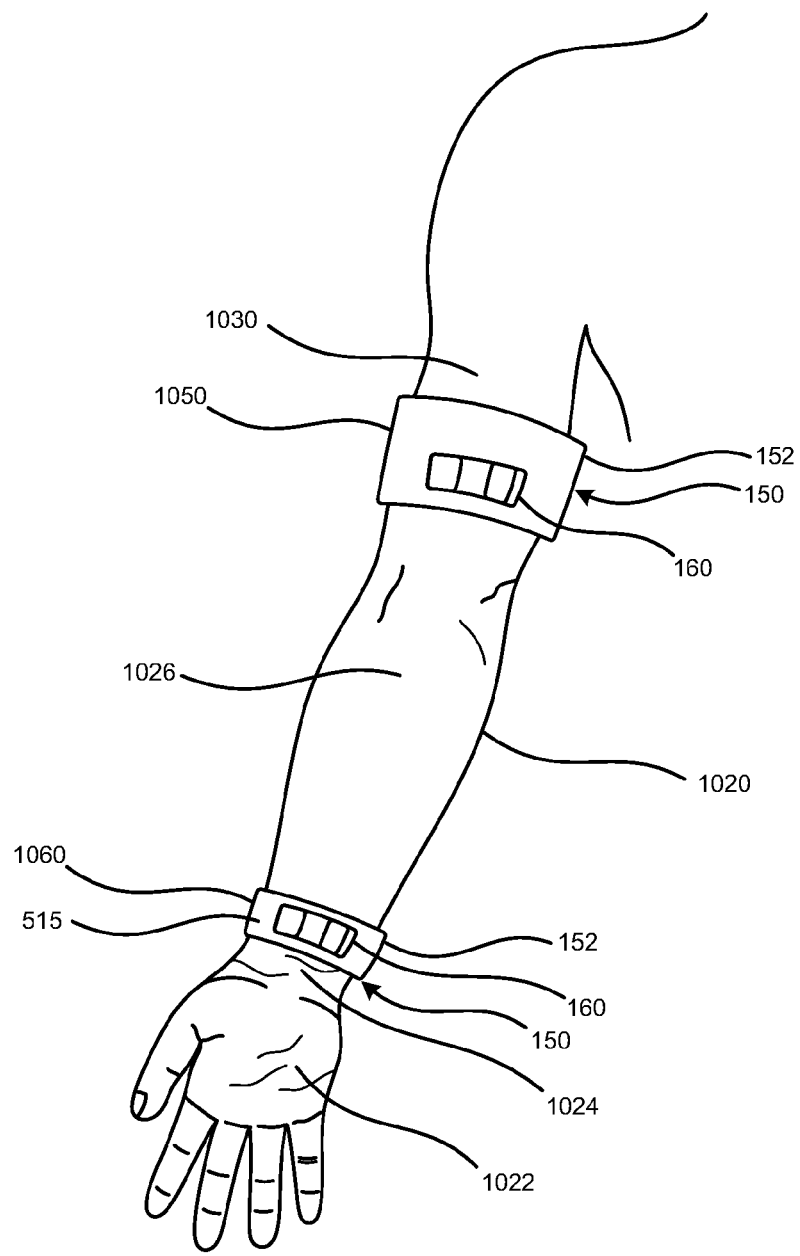
FIG. 10 illustrates two embodiments of the reconfigured CWE device being worn around the forearm and upper arm of a user.

Referring now to FIG. 10, there are shown two examples of CWE device 150 being worn in two different ways around a user's arm 1020. User arm 1020 includes hand 1022, wrist 1024, forearm 1026 and upper arm (or bicep) 1030. In one configuration, pliable casing 152 can be unfolded and at least partially wrapped around bicep 1030 to form or be configured in a curved shape as an armband 1050. With this implementation, pliable casing 152 curves around at least a portion of bicep 1030. In another configuration, pliable casing 152 can be folded and at least partially wrapped around wrist 1024 to form or be configured in a curved shape as wristband 1060. With this implementation, pliable casing 152 curves around at least a portion of wrist 1024. When pliable casing 152 is wrapped around the wrist or bicep, as shown, display screen 160 is positioned to the outside for viewing access. However, for embodiments in which CWE device 150 include a different type of (or additional) input and/or output (I/O) devices, such as a heart/pulse monitor or heat or vibration emitter (for alerting the wearer of an event or notification), CWE device 150 can be configured such that the particular I/O device is positioned against the surface of the object. With these embodiments, the ends of CWE device 150 would be folded towards the I/O device (i.e., opposite of the direction of the dashed arrows in FIG. 9A).

As will be appreciated by one skilled in the art, aspects of the present invention may be embodied as a system, or method. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all functional elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An electronic device comprising:
   a pliable casing made of at least one material that enables the electronic device to be configured in at least two different shapes, including a first shape that aligns the electronic device to a host device having a set physical shape and a second shape that has at least one different physical configuration of the casing relative to the first shape, wherein the host device is a second electronic device;
   electronic circuitry within the pliable casing that operates to provide at least one functional feature associated with the electronic device;
   a display screen embedded in the pliable casing and which displays at least one of data and an image corresponding to the functional feature;
   at least one communication mechanism that enables information exchange with the host device when the electronic device is brought in communication range of the host device; and
   at least one host-device retention feature affixed to the casing which enables the electronic device to securely attach to the host device when the electronic device is brought into contact with the host device while in the first shape.

2. The electronic device of claim 1, wherein the at least one communication mechanism comprises a physical communication affordance for coupling to a corresponding communication port located on the host device when the electronic device is brought into contact with a mating side of the host, while the electronic device is in the first shape and oriented with the communication affordance facing the mating side of the host device.

3. The electronic device of claim 2, wherein the communication affordance mates to the communication port while the electronic device is securely attached to the host device.

4. The electronic device of claim 1, further comprising a communication affordance that includes a power bus that enables the electronic device to receive power from the host device while the electronic device and the host device are physically interconnected and a data bus that enables communicating information between the electronic device and the host device.

5. The electronic device of claim 1, wherein the display screen is made of a pliable material that enables the display to bend along with the casing when a bending force is applied to the casing.

6. The electronic device of claim 1, wherein the casing is pre-designed with foldable sections to reconfigure the electronic device into at least one pre-defined wearable shape.

7. The electronic device of claim 6, wherein the pre-defined wearable shape is a curved shape, with the display screen positioned to fit on a wrist section of a human arm, with the casing extending about at least a portion of the wrist section.

8. The electronic device of claim 1, wherein the at least one communication mechanism comprises a wireless communication component that enables a paired wireless connection to the host device for wireless communication between the electronic device and the host device for use as at least one of an input device and an output device.

9. The electronic device of claim 1, wherein the electronic circuitry further comprises:
   a first processor communicatively coupled to the display screen;
   a first storage device communicatively coupled to the first processor and which stores firmware that enables the first processor to provide the at least one functional feature associated with the electronic device.

10. The electronic device of claim 1, wherein the at least one communication mechanism comprises a power receiving component that receives power from a power generating source of the host device, while the electronic device is within a charging range of the power generating source, and which utilizes the received power to charge a battery utilized to power the electronic device.

11. The electronic device of claim 1, wherein the electronic device further includes a detachable electronic module that can be selectively attached to and removed from the pliable casing.

12. The electronic device of claim 11, wherein the detachable electronic module contains at least one of:
 a tracking device that can be monitored by the host device when the detachable module is separated from the pliable casing;
 electronic components that enable the detachable module to operate independent of the pliable casing;
 a display that presents information corresponding to functional operation of the detachable module; and
 at least one wireless communication device enabling wireless communication with at least one of the pliable casing and the host device.

13. An apparatus comprising:
 a host device having a mating side;
 an electronic device that is selectively attachable to and detachable from the host device, the electronic device comprising:
  a pliable casing made of at least one material that enables the electronic device to be configured in at least two different shapes, including a first shape that aligns the electronic device to a second electronic device having a set physical shape and a second shape that has at least one different physical configuration of the casing relative to the first shape;
  electronic circuitry within the pliable casing that operates to provide at least one functional feature associated with the electronic device;
  a display screen embedded in the pliable casing and which displays at least one of data and an image corresponding to the functional feature; and
  at least one communication mechanism that enables information exchange with the host device when the electronic device is brought in communication range of the host device.

14. The apparatus of claim 13, wherein the at least one communication mechanism comprises a physical communication affordance for coupling to a corresponding communication port located on the host device when the electronic device is brought into contact with a mating side of the host, while the electronic device is in the first shape and oriented with the communication affordance facing the mating side of the host device.

15. The apparatus of claim 14, further comprising: at least one host-device retention feature affixed to the casing which enables the electronic device to securely attach to the host device when the first device is brought into contact with the host device while in the first shape, wherein the communication affordance mates to the communication port while the electronic device is securely attached to the host device.

16. The apparatus of claim 14, wherein the communication affordance includes a power bus that enables the electronic device to receive power from the host device while the electronic device and the host device are interconnected and a data bus that enables communicating information between the electronic device and the host device.

17. The apparatus of claim 13, wherein the display screen is made of a pliable material that enables the display to bend along with the casing when a bending force is applied to the casing.

18. The apparatus of claim 13, wherein the casing is pre-designed with foldable sections to reconfigure the electronic device into at least one pre-defined wearable shape.

19. The apparatus of claim 18, wherein the pre-defined wearable shape is a curved shape, with the display screen positioned to fit on a wrist section of a human arm, with the casing extending about at least a portion of the wrist section.

20. The apparatus of claim 13, wherein the at least one communication mechanism comprises a wireless communication component that enables a paired wireless connection to the host device for wireless communication between the electronic device and the host device for use as at least one of an input device and an output device.

21. The apparatus of claim 13, wherein the electronic circuitry further comprises:
 a first processor communicatively coupled to the display screen;
 a first storage device communicatively coupled to the first processor and which stores firmware that enables the first processor to provide the at least one functional feature associated with the electronic device.

22. The apparatus of claim 13, wherein the host device is a mobile device comprising:
 a first processor communicatively connected to the communication mechanism;
 a second display screen communicatively coupled to the first processor;
 a first storage device communicatively coupled to the first processor;
 a first input/output device communicatively coupled to the first processor;
 at least one of (i) a communication port embedded within a mating side of the second electronic device; (ii) a wireless transceiver; (iii) a power generating, charging component; and (iv) a receptacle disposed in the mating side of the second electronic device, the receptacle dimensioned to receive the electronic device; and
 functional software stored on the first storage device, which software is executed by the processor to enable the second electronic device to perform associated device functions and to interface with the electronic device.

23. The apparatus of claim 13, wherein the electronic device further includes a detachable module that can be selectively attached to and removed from the pliable casing.

24. The apparatus of claim 23, wherein the detachable module comprises at least one of:
 a tracking device that can be monitored by the host device when the detachable module is separated from the pliable casing;
 electronic components that enable the detachable module to operate independent of the pliable casing;
 a display that presents information corresponding to functional operation of the detachable module; and
 at least one wireless communication device enabling wireless communication with at least one of the pliable casing and the host device.

* * * * *